(12) United States Patent
Lo

(10) Patent No.: US 12,420,795 B2
(45) Date of Patent: Sep. 23, 2025

(54) BRAKE TORQUE TRANSFERRING VIA LIMITED SLIP AND LOCKING DIFFERENTIALS BASED ON DETECTED FAILURE OF BRAKE CIRCUITS

(71) Applicant: GM GLOBAL TECHNOLOGY OPERATIONS LLC, Detroit, MI (US)

(72) Inventor: Joshua Lo, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 275 days.

(21) Appl. No.: 18/094,441

(22) Filed: Jan. 9, 2023

(65) Prior Publication Data

US 2024/0227808 A1  Jul. 11, 2024

(51) Int. Cl.
*B60W 10/16* (2012.01)
*B60W 10/184* (2012.01)
*B60W 30/18* (2012.01)
*B60W 50/035* (2012.01)
B60T 8/1755 (2006.01)

(52) U.S. Cl.
CPC ...... *B60W 30/18109* (2013.01); *B60W 10/16* (2013.01); *B60W 10/184* (2013.01); *B60W 50/035* (2013.01); *B60W 2710/18* (2013.01)

(58) Field of Classification Search
CPC ............. B60W 10/16; B60W 2510/12; B60W 50/035; B60W 10/192; B60W 10/184; B60W 30/18109; B60W 2710/18; B60T 2270/82; B60T 2201/14; B60T 2270/402; B60T 8/1755; B60T 8/17551; B60T 8/176
See application file for complete search history.

(56) References Cited

U.S. PATENT DOCUMENTS

| | | | |
|---|---|---|---|
| 3,850,274 A * | 11/1974 | McLean ................. | B60W 10/18 475/86 |
| 2001/0054843 A1* | 12/2001 | Schmidt ................. | B60T 17/226 303/122.13 |
| 2005/0057095 A1* | 3/2005 | Hac .......................... | B60T 8/885 303/122 |
| 2017/0361834 A1* | 12/2017 | Paskus ................... | B60T 8/1708 |
| 2018/0257656 A1* | 9/2018 | Zhao ....................... | B60K 6/52 |
| 2018/0273006 A1* | 9/2018 | Murayama .......... | B60T 8/17551 |
| 2019/0315325 A1* | 10/2019 | Yun ........................ | B60T 17/221 |
| 2020/0198636 A1* | 6/2020 | Dhansri ................ | B60W 10/16 |
| 2023/0042441 A1* | 2/2023 | Fujita .................... | F16D 65/183 |

* cited by examiner

*Primary Examiner* — Khoi H Tran
*Assistant Examiner* — Tanner L Cullen

(57) ABSTRACT

A braking system includes brake circuits and a brake stability module. The brake circuits are configured to be independently activated and deactivated and when activated apply braking force at respective wheels of a vehicle. The braking stability module is configured to i) detect a failure with a first one of the brake circuits of a first axle of the vehicle, ii) lock or adjust an amount of engagement of a differential of the first axle of the vehicle to distribute brake force from a second one of the brake circuits of the first axle to one of the wheels at the first one of the brake circuits, and iii) control operation of the second one of the brake circuits to brake torque the one of the wheels at the first one of the brake circuits.

19 Claims, 6 Drawing Sheets

BRAKE TORQUE TRANSFERRING VIA LIMITED SLIP AND LOCKING DIFFERENTIALS BASED ON DETECTED FAILURE OF BRAKE CIRCUITS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to brake-by-wire systems.

Vehicles can include brake-by-wire systems for electronic deceleration purposes. The deceleration purposes may be associated with a brake torque request generated by a vehicle control module and/or as a result of a user actuating a brake actuator. For example, vehicles can include deceleration control systems, object detection systems, collision avoidance systems, adaptive cruise control systems, forward collision warning systems, and autonomous vehicle control systems for detecting objects and taking actions to avoid a collision. An adaptive cruise control system may adjust speed of a host vehicle to prevent collision with another vehicle in front of the host vehicle. A collision avoidance system may detect an oncoming vehicle and take an evasive action and/or perform a countermeasure to avoid colliding with the approaching vehicle. The actions performed may include applying a brake to decelerate the host vehicle.

SUMMARY

A braking system is disclosed and includes brake circuits and a brake stability module. The brake circuits are configured to be independently activated and deactivated and when activated apply braking force at respective wheels of a vehicle. The braking stability module is configured to i) detect a failure with a first one of the brake circuits of a first axle of the vehicle, ii) lock or adjust an amount of engagement of a differential of the first axle of the vehicle to distribute brake force from a second one of the brake circuits of the first axle to one of the wheels at the first one of the brake circuits, and iii) control operation of the second one of the brake circuits to brake torque the one of the wheels at the first one of the brake circuits.

In other features, the braking stability module is configured to control operation of the second one of the brake circuits to concurrently brake torque the one of the wheels at the first one of the brake circuits and the one of the wheels at the second one of the brake circuits.

In other features, the braking stability module is configured to, in response to detecting the failure with a first one of the brake circuits, lock the differential.

In other features, the braking stability module is configured to, in response to detecting the failure with a first one of the brake circuits, adjust the amount of engagement of the differential to adjust an amount of brake torque transfer from the second one of the brake circuits to the one of the wheels at the first one of the brake circuits.

In other features, the braking stability module is configured to adjust the amount of engagement of the differential to minimize a yaw rate of the vehicle during a braking event.

In other features, the braking stability module is configured to: based on a steering angle of the vehicle, determine a maximum amount of electronic limited slip differential coupling possible while avoiding wheel scrub; based on the maximum amount of electronic limited slip differential coupling, determine a percentage of brake torque that would be transferred across the first axle; and determine a maximum amount of brake torque that is able to be provided by the first axle via the second one of the brake circuits. The braking stability module is also configured to: based on a braking input request, the percentage of brake torque that would be transferred across the first axle, and the maximum amount of brake torque that is able to be provided via the first axle, determine amounts of brake torque for the first axle and a second axle and amounts to distribute to the first one of the brake circuits and the second one of the brake circuits; and adjust the amount of engagement of the differential based on the amounts of brake torque for the first axle and the second axle and the amounts to distribute to the first one of the brake circuits and the second one of the brake circuits.

In other features, the braking stability module is configured to: determine amounts of brake torque to distribute to a third one of the brake circuits of the second axle and a fourth one of the brake circuits of the second axle to minimize yaw rate of the vehicle; and adjust the amount of engagement of the differential and control brake torque distribution based on the determined amounts of brake torque to distribute to the first one of the brake circuits, the second one of the brake circuits, the third one of the brake circuits, and the fourth one of the brake circuits.

In other features, the braking stability module is configured to: lock the differential; while the differential is locked, determine a maximum amount of brake torque that is able to be provided by the first axle via the second one of the brake circuits; based on a braking input request and the maximum amount of brake torque that is able to be provided via the first axle and to minimize yaw rate of the vehicle, determine amounts of brake torque for the first axle and a second axle and amounts to distribute to the first one of the brake circuits and the second one of the brake circuits; and control some of the brake circuits, not including the first one of the brake circuits, based on the amounts of brake torque for the first axle and the second axle and the amounts to distribute to the first one of the brake circuits and the second one of the brake circuits.

In other features, the braking stability module is configured to determine a side-to-side brake torque differential of the vehicle and reduce the side-to-side brake torque differential by adjusting brake torque provided by the brake circuits except the first one of the brake circuits, which is deactivated.

In other features, the braking stability module is configured to detect a failure of the first one of the brake circuits and maintain active operation of all of the other ones of the brake circuits to maximize deceleration of the vehicle while minimizing yaw rate of the vehicle.

In other features, a braking stability method is disclosed and includes: detecting a failure with a first one of multiple brake circuits of a first axle of a vehicle, the brake circuits configured to be independently activated and deactivated and when activated apply braking force at respective wheels of the vehicle; locking or adjusting an amount of engagement of a differential of the first axle of the vehicle to distribute brake force from a second one of the brake circuits of the first axle to the one of the wheels at the first one of the brake circuits; and controlling operation of the second one of the brake circuits to brake torque the one of the wheels at the first one of the brake circuits.

In other features, the braking stability method further includes controlling operation of the second one of the brake circuits to concurrently brake torque the one of the wheels at the first one of the brake circuits and the one of the wheels at the second one of the brake circuits.

In other features, the braking stability method further includes, in response to detecting the failure with a first one of the brake circuits, lock the differential.

In other features, the braking stability method further includes, in response to detecting the failure with a first one of the brake circuits, adjusting the amount of engagement of the differential to adjust an amount of brake torque transfer from the second one of the brake circuits to the one of the wheels at the first one of the brake circuits.

In other features, the braking stability method further includes adjusting the amount of engagement of the differential to minimize a yaw rate of the vehicle during a braking event.

In other features, the braking stability method further includes: based on a steering angle of the vehicle, determining a maximum amount of electronic limited slip differential coupling possible while avoiding wheel scrub; based on the maximum amount of electronic limited slip differential coupling, determining a percentage of brake torque that would be transferred across the first axle; and determining a maximum amount of brake torque that is able to be provided by the first axle via the second one of the brake circuits. The method further includes: based on a braking input request, the percentage of brake torque that would be transferred across the first axle, and the maximum amount of brake torque that is able to be provided via the first axle, determining amounts of brake torque for the first axle and a second axle and amounts to distribute to the first one of the brake circuits and the second one of the brake circuits; and adjusting the amount of engagement of the differential based on the amounts of brake torque for the first axle and the second axle and the amounts to distribute to the first one of the brake circuits and the second one of the brake circuits.

In other features, the braking stability method further includes: determining amounts of brake torque to distribute to a third one of the brake circuits of the second axle and a fourth one of the brake circuits of the second axle to minimize yaw rate of the vehicle; and adjusting the amount of engagement of the differential and control brake torque distribution based on the determined amounts of brake torque to distribute to the first one of the brake circuits, the second one of the brake circuits, the third one of the brake circuits, and the fourth one of the brake circuits.

In other features, the braking stability method further includes: locking the differential; while the differential is locked, determining a maximum amount of brake torque that is able to be provided by the first axle via the second one of the brake circuits; based on a braking input request and the maximum amount of brake torque that is able to be provided via the first axle and to minimize yaw rate of the vehicle, determining amounts of brake torque for the first axle and a second axle and amounts to distribute to the first one of the brake circuits and the second one of the brake circuits; and controlling some of the brake circuits, not including the first one of the brake circuits, based on the amounts of brake torque for the first axle and the second axle and the amounts to distribute to the first one of the brake circuits and the second one of the brake circuits.

In other features, the braking stability method further includes determining a side-to-side brake torque differential of the vehicle and reducing the side-to-side brake torque differential by adjusting brake torque provided by the brake circuits except the first one of the brake circuits, which is deactivated.

In other features, the braking stability method further includes detecting a failure of the first one of the brake circuits and maintaining active operation of all of the other ones of the brake circuits to maximize deceleration of the vehicle while minimizing yaw rate of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
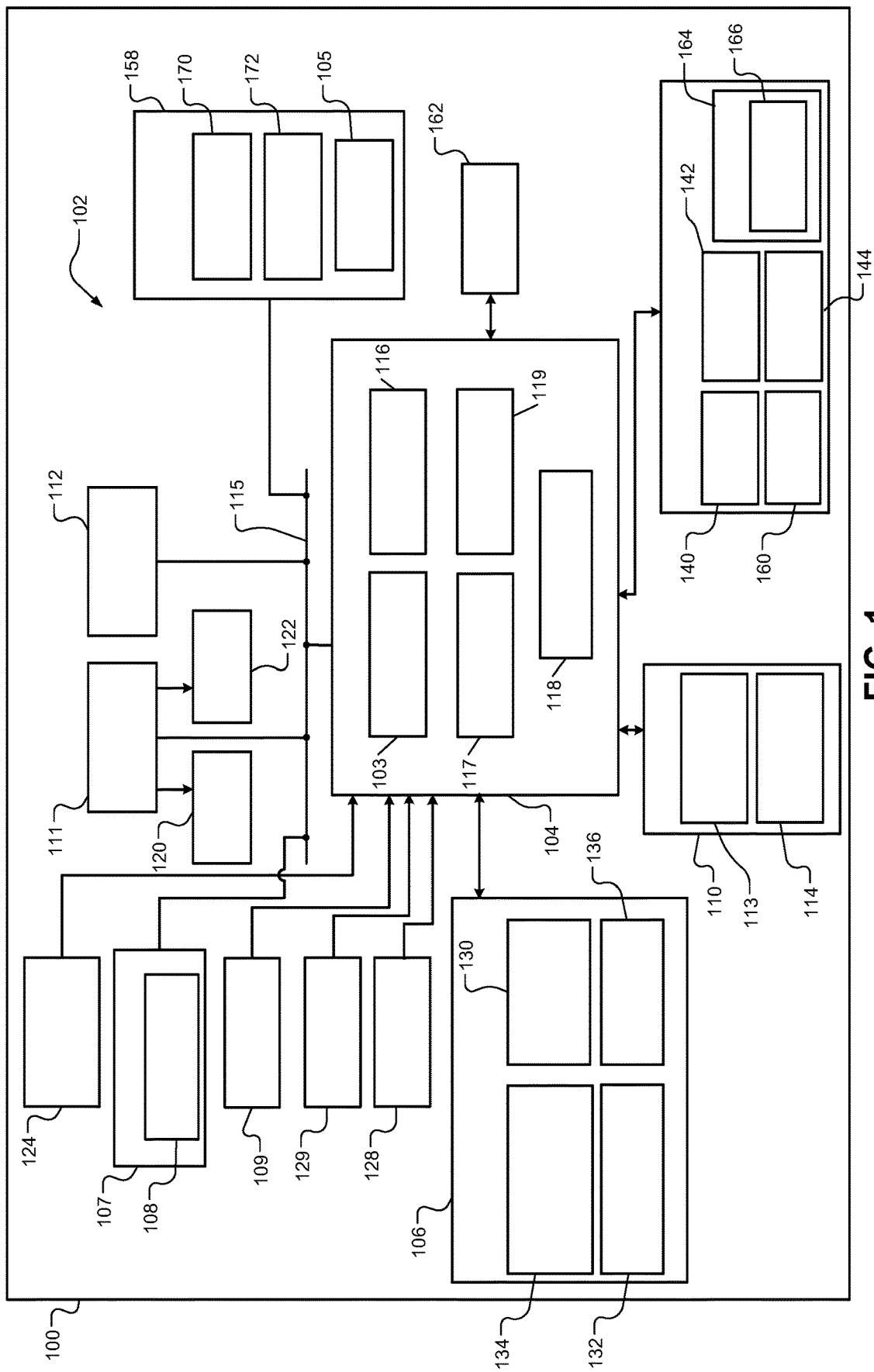
FIG. 1 is a functional block diagram of a vehicle including one or more differentials and a brake control system including a braking stability module in accordance with the present disclosure.

A traditional hydraulic braking system may include two hydraulic circuits, which are configured to apply brake pressure at corresponding brake calipers. As an example, each hydraulic circuit may be used to apply brake pressure at one front wheel caliper and one rear wheel caliper of a four-wheel vehicle. For each hydraulic circuit, the front wheel caliper is diagonally located from and thus on an opposite side of the vehicle from the rear wheel caliper. In the event of a braking system failure (e.g., hydraulic fluid leak) with one of the hydraulic circuits, the other hydraulic circuit can be used to decelerate the vehicle. As another example, a first hydraulic circuit may include the two front brake calipers and the second hydraulic circuit may include the two rear brake calipers. In these traditional hydraulic braking systems, the brake calipers are hydraulically connected to a brake actuator (e.g., a brake pedal).

Some traditional hydraulic braking systems having two hydraulic circuits are configured to allow a first one of the hydraulic circuits experiencing a failure to be disconnected or isolated. This is due to the fact that hydraulic braking system failures are not generally found at the wheel of a vehicle but rather upstream where the failure affects a brake circuit. Although the hydraulic circuit of a braking system that is experiencing a failure is able to be disconnected, the braking system has a reduced amount of total available braking force due to only being able to apply brake force using two brake calipers instead of four brake calipers.

In brake-by-wire systems implementing electromechanical braking (EMB) and including single corner actuators (SCAs), the potential for a failure at the wheel (i.e., at an EMB caliper) increases because an EMB caliper consists of an electronic controller, an electric motor, and wiring connections rather than a simple mechanical caliper. EMB and SCA systems do not have a mechanical backup braking mode and thus when a EMB caliper is not functional, the non-functioning EMB caliper cannot be used for braking.

The examples set forth herein include braking stability control systems for mitigating differential brake torque between sides of a vehicle and yaw rate experienced by a vehicle during braking events. The braking stability control systems further mitigate differential brake torque and yaw rate experienced by a vehicle while providing increased braking during braking events. The increased braking is relative to a traditional dual circuit braking system when a braking system failure in one of the circuits exists.

The examples disclosed herein include transferring brake torque from a first controller and/or assembly on a first side of a vehicle and a first end of an axle to a wheel at a failed brake controller and/or assembly on a second side of the vehicle and a second end of the axle. For example, a left rear brake controller and/or assembly may have failed and brake torque is transferred from the right rear brake controller and/or assembly through the rear axle to the left wheel, such that the right rear brake controller and/or assembly is decelerating both rear wheels. The examples include using an eLSD or a locking differential to transfer brake torque from a first side of a vehicle to a second side of a vehicle via components of a corresponding axle.

In the following example, a fully active mode refers to when all brake circuits (e.g., all four brake controllers and corresponding calipers) of a vehicle are active. A partially active mode refers to when a braking system failure exists with one or more brake circuits and the one or more brake circuits are deactivated and prevented from providing brake torque. As an example, one brake controller and/or caliper may be deactivated while the three other brake controllers and/or calipers may be active. Differential brake torque refers to when more brake torque is provided on a first side (e.g., driver or passenger side) of the vehicle than on the other side of the vehicle causing the vehicle to pull toward the side of the vehicle experiencing the higher level of braking torque.

Figure 2:
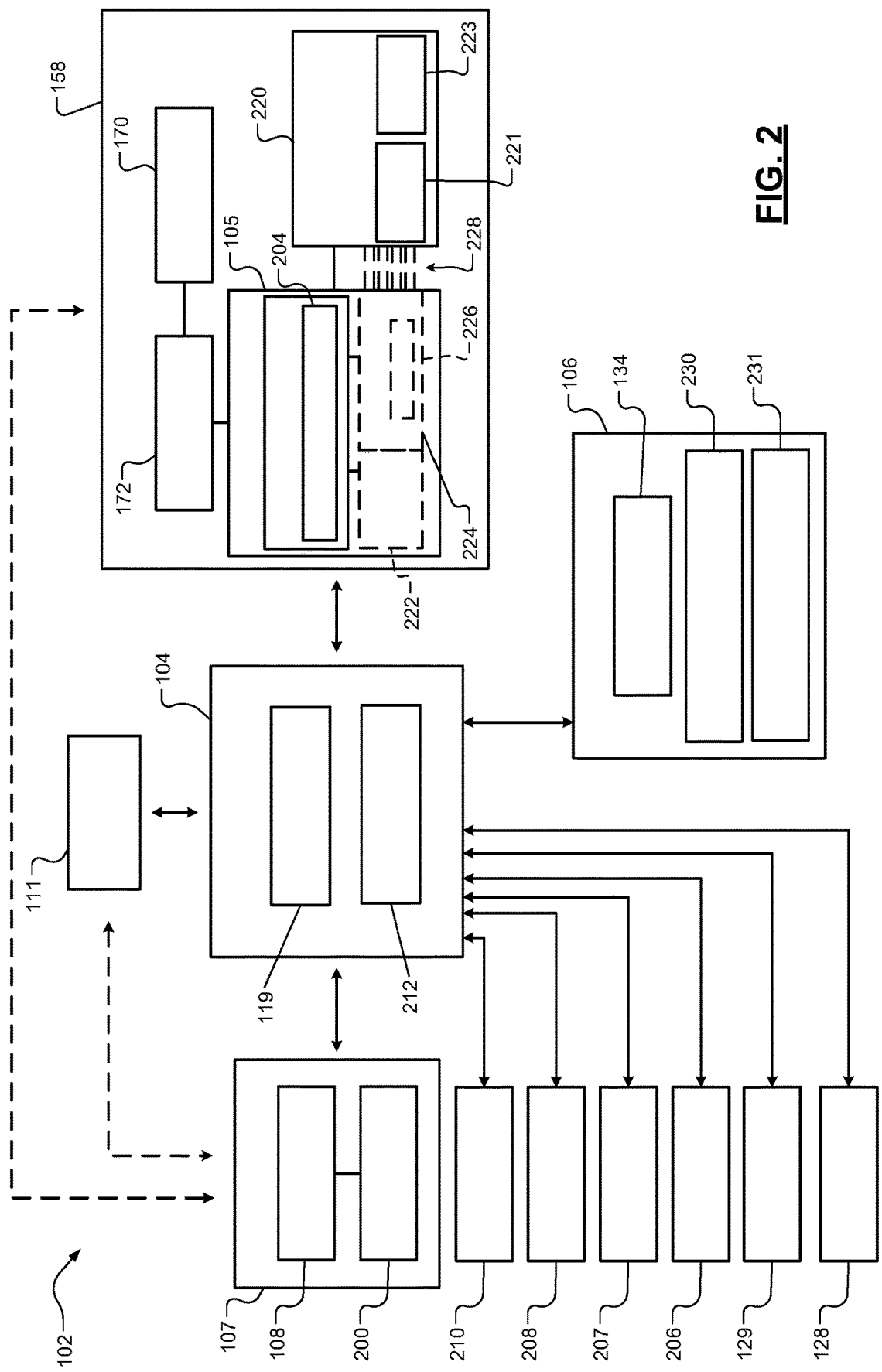
FIG. 2 is a function block diagram of the brake control system including an electronic braking control module (EBCM) including a braking stability module in accordance with the present disclosure.

FIG. 1 shows a vehicle 100 including a brake control system 102 including a braking stability module 103. Although the braking stability module 103 is shown as being implemented at a vehicle control module 104, the braking stability module 103 may be implemented at an electronic braking control module (EBCM) 105, as shown in FIG. 2. The braking stability module 103 and/or the EBCM 105 provides brake stability during braking events including adjusting brake torque provided via brake controllers and calipers (shown in FIG. 2) to minimize changes in and/or magnitudes of differential brake levels and/or yaw rates during braking events. This stability is provided while operating in fully active and partially active modes. The braking stability module 103 performs electronic stability control and determines and controls amount of brake torque transfer across axles having a differential, as further described below with respect to the methods of FIGS. 6-7.

The braking stability module 103 and/or the EBCM 105 may select brake pressure versus brake actuator profiles and/or brake force versus brake actuator profiles to follow during braking events for each brake controller. This selection may be based on permanent vehicle handling characteristics, dynamic vehicle state parameters, location of active brake controllers/calipers on the vehicle 100, etc. The permanent vehicle handling characteristics may refer to suspension geometry of the vehicle, size of brake calipers and pads, number of pistons per caliper, and/or other parameters that are unchanged during operation. The dynamic vehicle state parameters may include yaw rate of the vehicle 100, speed of the vehicle 100, deceleration rate of the vehicle 100, steering angle of a steering wheel and/or front wheels of the vehicle 100, load states of axles of the vehicle 100, etc. A load state refers to amount of weight on each axle of the vehicle 100. The locations of the active brake controllers may refer to left-front, right-front, left-rear, and right-rear for the four brake controllers and corresponding brake calipers at respective wheels of the vehicle 100. The stated profiles may be i) selected as baselines and provide pressure and/or force values based on the stated characteristics, parameters, locations, and brake torque requests, and/or ii) altered based on the stated parameters, locations, torque differentials thresholds, and/or yaw rate thresholds.

The vehicle 100 may be a non-autonomous, partially autonomous or fully autonomous vehicle. The vehicle 100 may be non-electric, hybrid or fully electric vehicle. The vehicle 100 includes vehicle control module 104, a memory 106, a vision sensing (or perception) system 107 including object detection sensors 108, and other sensors 109. The vehicle 100 may further include a power source 110, an infotainment module 111 and other control modules 112. The power source 110 includes one or more battery packs (one battery pack 113 is shown) and a control circuit 114. The object detection sensors 108 may include cameras, radar sensors, lidar sensors, etc. The other sensors 109 may include temperature sensors, accelerometers, gyroscope, steering angle sensor, wheel speed sensors, a vehicle velocity sensor, and/or other sensors. The modules 104, 105, 111, 112 may communicate with each other and have access to the memory 106 via one or more buses and/or network interfaces 115. The network interfaces 115 may include a controller area network (CAN) bus, a local interconnect network (LIN) bus, an auto network communication protocol bus, and/or other network bus.

The vehicle control module 104 controls operation of vehicle systems. The vehicle control module 104 may include the braking stability module 103, an antilock braking module 116 (associated with an antilock braking system), a mode selection module 117, a parameter adjustment module 118, an object detection module 119, as well as other modules. The antilock braking module 116 regulates braking in order to reduce speed, decelerate, and/or stop a vehicle while preventing brake calipers from locking up during braking events. The mode selection module 117 may select a vehicle operating mode. The parameter adjustment module 118 may be used to adjust, obtain and/or determine parameters of the vehicle 100 based on, for example, signals from the sensors 108, 109 and/or other devices and modules referred to herein.

The vehicle 100 may further include a display 120, an audio system 122, and one or more transceivers 124. The display 120 and/or audio system 122 may be implemented along with the infotainment module 111 as part of an infotainment system. The display 120 and/or audio system 122 may be used to indicate brake alert messages to apply brakes due to an approaching and/or nearing object.

The vehicle 100 may further include a global positioning system (GPS) receiver 128 and a MAP module 129. The GPS receiver 128 may provide vehicle velocity and/or direction (or heading) of the vehicle and/or global clock timing information. The GPS receiver 128 may also provide vehicle location information. The MAP module 129 provides map information. The map information may include traffic control objects, routes being traveled, and/or routes to be traveled between starting locations (or origins) and destinations. The vision sensing system 107, the GPS receiver 128 and/or the MAP module 129 may be used to determine location of objects and position of the host vehicle 100 relative to the objects. This information may also be used to determine i) heading information of the host vehicle 100 and/or the objects, and ii) a relative speed of the host vehicle 100 relative to the objects.

The memory 106 may store sensor data 130, vehicle parameters 132, a braking stability application 134 and other applications 136. The braking stability application 134 may be implemented by the braking stability module 103 and/or the EBCM 105. The applications 136 may include applications executed by the modules 104, 111, 112. Although the memory 106 and the vehicle control module 104 are shown as separate devices, the memory 106 and the vehicle control module 104 may be implemented as a single device. The memory 106 may be accessible to the EBCM 105. The EBCM 105 may also include memory storing the braking stability application 134 and/or brake information, such as brake pressure or force versus brake actuator distance profiles. The brake pressure or force versus brake actuator distance profiles may be stored in the memory 106. See also FIG. 2.

The vehicle control module 104 may control operation of a propulsion system 139 that includes an engine 140, a converter/generator 142, a transmission 144, and/or electric motors 160, as well as control operation of a brake actuator system 158 and/or a steering system 162 according to parameters set by the modules 103, 104, 105, 111, 112, 116, 118, 119. The vehicle control module 104 may set some of the vehicle parameters 132 based on signals received from the sensors 108, 109. The vehicle control module 104 may receive power from the power source 110, which may be provided to the engine 140, the converter/generator 142, the transmission 144, the brake actuator system 158, the electric motors 160 and/or the steering system 162, etc. Some of the vehicle control operations may include enabling fuel and spark of the engine 140, starting and running the electric motors 160, powering any of the systems 102, 158, 162, and/or performing other operations as are further described herein.

The engine 140, the converter/generator 142, the transmission 144, the brake actuator system 158, the electric motors 160 and/or the steering system 162 may include actuators controlled by the vehicle control module 104 to, for example, adjust fuel, spark, air flow, steering wheel angle, throttle position, pedal position, etc. This control may be based on the outputs of the sensors 108, 109, the GPS receiver 128, the MAP module 129 and the above-stated data and information stored in the memory 106.

The propulsion system 139 may also include one or more axles 164 including one or more differentials 166 of one or more axles 164 of the vehicle 100. Brake torque is transferred via the axles 164 and the differential 166 as described herein.

The brake actuator system 158 may be implemented as a brake-by-wire system, such as an electromechanical braking system or an electro-hydraulic braking system. In an embodiment, the brake actuator system 158 may include the EBCM 105, a brake actuator 170 and a brake actuator sensor 172. The brake actuator 170 may include a traditional style brake pedal and/or other brake actuator, such as a handheld brake actuator. The brake actuator sensor 172 detects position of the brake actuator 170, which is used to determine displacement of the brake actuator 170. The EBCM 105 may include a motor (or pump) and an electronic control module for controlling operation of the motor. The motor may adjust brake pressure. The brake pressure may refer to pressure of a hydraulic fluid used to actuate brake pads. In an electromechanical configuration, the motor is not included.

The vehicle control module 104 may determine various parameters including a vehicle speed, an engine speed, an engine torque, yaw rate, a gear state, an accelerometer position, a brake pedal position, an amount of regenerative (charge) power, and/or other information.

FIG. 2 shows the brake control system 102 including the EBCM 105, which includes an electronic control module 202 implementing a braking stability module 204. The braking stability module 204 may operate similarly as the braking stability module 103 of FIG. 1. The brake control system 102 further includes the vehicle control module 104, the memory 106, the vision sensing system 107, the infotainment module 111, and the brake actuator system 158. The vision sensing system 107 may include the object detection sensor 108 and an object detection module 200. The object detection module 200 may be implemented at the vehicle control module 104. If implemented at the vision sensing system 107, the object detection module 200 may communicate with the infotainment module 111 and/or, for example, an electronic control module 202 of the EBCM 105. The object detection module 200 may operate similarly as the object detection module 119.

The object detection modules 119 and 200 may detect objects, determine locations of the objects relative to the host vehicle, and determine headings and speeds of the objects and/or the host vehicle. The speed of the host vehicle may be determined via a vehicle speed sensor 206. The locations, headings and/or speeds of the host vehicle and the objects may be determined via the GPS receiver 128 and the MAP module 129. The object detection modules 119, 200 and/or a braking module 212 may determine, based on this location, heading and speed information, whether braking is warranted. If yes, brakes may be applied and/or an alert message may be sent to the infotainment module 111 to indicate to the driver to apply the brakes. The alert message may be sent from any of the modules 104, 118, 200, 212 to the infotainment module 111.

The vehicle control module 104 may also obtain vehicle speed and wheel speed information from a vehicle speed sensor 206 and wheel speed sensors 207. The vehicle control module 104 may further determine the yaw rate of the vehicle 100 based on an output from a yaw rate sensor 208 (e.g., an accelerometer). Load on axles of the vehicle 100 may be determined based on outputs of load sensors 210.

The braking module 212 of the vehicle control module 104 may i) select a brake pressure or force versus brake actuator distance profile (hereinafter referred to as the "selected profile") and send the selected profile to the electronic control module 202 along with a current detected brake actuator displacement value, and/or ii) signal the electronic control module 202 a current detected brake actuator displacement value and object related information. The current detected brake actuator displacement value indicates a current position of the brake actuator 170. The electronic control module 202 may adjust brake pressure or force based on the selected profile and the current detected brake actuator displacement value. The brake pressure and force are directly related. In another embodiment, the electronic control module 202 selects the profile, based on information provided to the electronic control module 202, such as locations, headings, speeds, and/or accelerations/decelerations of the host vehicle and a detected object of concern. The profile may also be selected based on the axle loading.

The braking stability module 103 and the electronic control module 202 may perform operations as further described below with respect to FIGS. 3-7 to stabilize braking of the vehicle.

The brake actuator system 158, as stated above, may be implemented as a brake-by-wire system, such as an electromechanical braking system or an electrohydraulic braking system The brake actuator system 158 may include the EBCM 105, the brake actuator 170, the brake actuator sensor 172, and brake controllers and/or assemblies 220. The brake actuator system 158 is provided as an example and may be configured differently than shown in FIG. 2. As an example, the brake controllers and/or assemblies 220 may each be referred to as a brake circuit and include a EMB caliper including an electronic controller, an electric motor (or pump), and wiring connections (electromechanical braking system configuration). One or more EBCMs may be included. As an example, an EBCM may be included for the front wheels of the vehicle 100 and another EBCM may be included for the rear wheels of the vehicle.

The EBCM 105 may include the electronic control module 202 and a motor (or pump) 222. The motor 222 may be included for an electrohydraulic braking system configuration. A valve assembly 224 may be included as part of the EBCM 105, as shown or may be separate from the EBCM 105. The valve assembly 224 include valves 226 that may be connected to the motor 222 and control fluid connection between the motor 222 and the brake controllers and/or assemblies 220. Fluid lines 228 may be connected between the valve assembly 224 and the brake controllers and/or assemblies 220. When implemented as an electromechanical braking system, the motor 222, the valve assembly 224 and the fluid lines 228 are not included.

The electronic control module (ECM) 202 and/or braking stability module 103 controls the motor 222 and the states of the valves 226 to adjust brake pressure. This may be based on a selected one of the brake pressure versus brake actuator distance profiles 230 stored in the memory 106 and/or pressures indicated by the braking stability module 103. This may additionally or alternatively be based on a selected one of brake force versus brake actuator distance profiles 231 stored in the memory 106 and/or forces indicated by the braking stability module 103. One of the brake pressure or force versus brake actuator distance profiles 230, 231 may be selected by, for example, the braking stability module 103 and/or the electronic control module 202. The stated control may also be based on yaw rate, axle loads, vehicle speed, steering angle, scrub radius, and/or other permanent vehicle handling characteristics, and dynamic vehicle state parameters as further described below. The permanent vehicle handling characteristics and the dynamic vehicle state parameters may be stored in the memory 106

Scrub radius is defined by a point in space where an imaginary line traced down through the center of the suspension system column of a tire (on a wheel) crosses a line drawn vertically down through a center of a tire relative to an outer surface of the tire. The suspension system may be angled, where the wheel may not be angled (or perpendicular to a road surface). The scrub radius may be positive, zero or negative.

The brake actuator system 158 and/or the brake controllers and/or assemblies 220 may include brake sensors 221 and brake calipers 223. The brake sensors 221 may include pressure sensors, position sensors, temperature sensors, fluid detection sensors, etc. for detecting states of brake circuits, where each brake circuit includes one of the brake controllers and/or assemblies. The states of the brake circuits may include pressures, temperatures and/or presence of hydraulic fluid in each of the brake circuits. Each of the brake circuits includes a respect brake caliper. The sensors are monitored to detect when a failure exists in one or more of the brake circuits. A failure may exist, for example, when a brake actuator motor is ceased, has a short circuit, and/or other issue. A failure may exist when the ECM 202 is not communicating with the vehicle control module 104. This may be detected by the ECM 202 and/or the vehicle control module 104. The vehicle control module 104 may perform brake system diagnostic operations to detect a failure associated with the brake actuator system 158. These parameters are additional examples of the dynamic vehicle state parameters.

Figure 3:
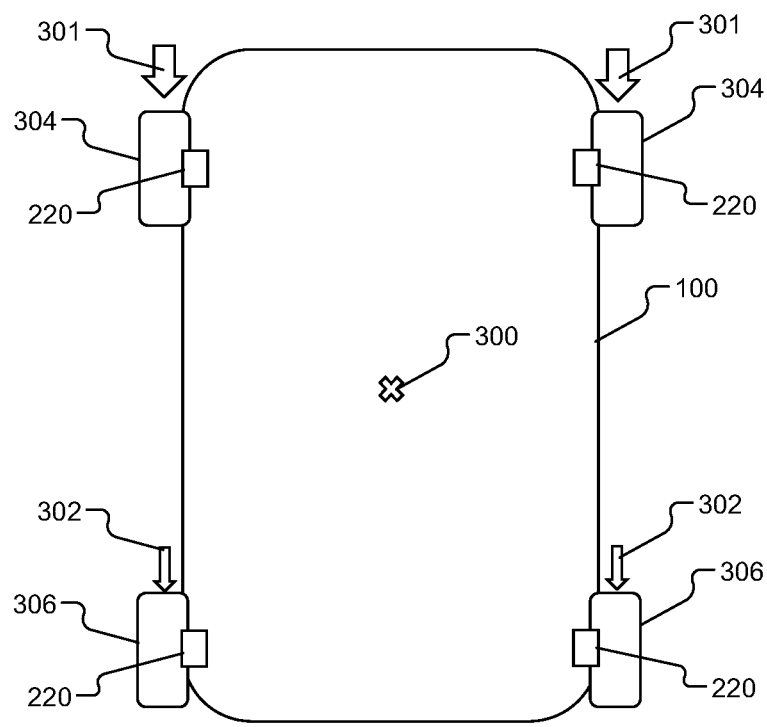
FIG. 3 is a top view of the vehicle of FIG. 1 illustrating relative and balanced application of brake torque via four active brake controllers while operating in a normal braking mode.

FIG. 3 shows the vehicle 100 illustrating relative and balanced application of brake torque via four active brake controllers while operating in a normal braking mode (i.e., fully active mode). The vehicle 100 includes a center of gravity, designated by 'X' 300 and four brake controllers and/or assemblies 220. Each of the brake controllers and/or assemblies 220 may include a brake controller, a motor (or pump) a brake caliper, brake pads, etc. The brake calipers are designated 223 in FIG. 2. As shown by large arrows 301 and small arrow 302, a larger amount of brake pressure may be applied to the two front wheels 304 than the two rear wheels 306. Brake tractive force (or simply braking force) is balanced side-to-side because a same total amount of brake tractive force is applied to the left (or driver) side wheels as is applied to the right (or passenger) side wheels. A same amount of brake tractive force is exerted on the left front wheel as the right front wheel. A same amount of brake tractive force is exerted on the left rear wheel as the right rear wheel.

Figure 4:
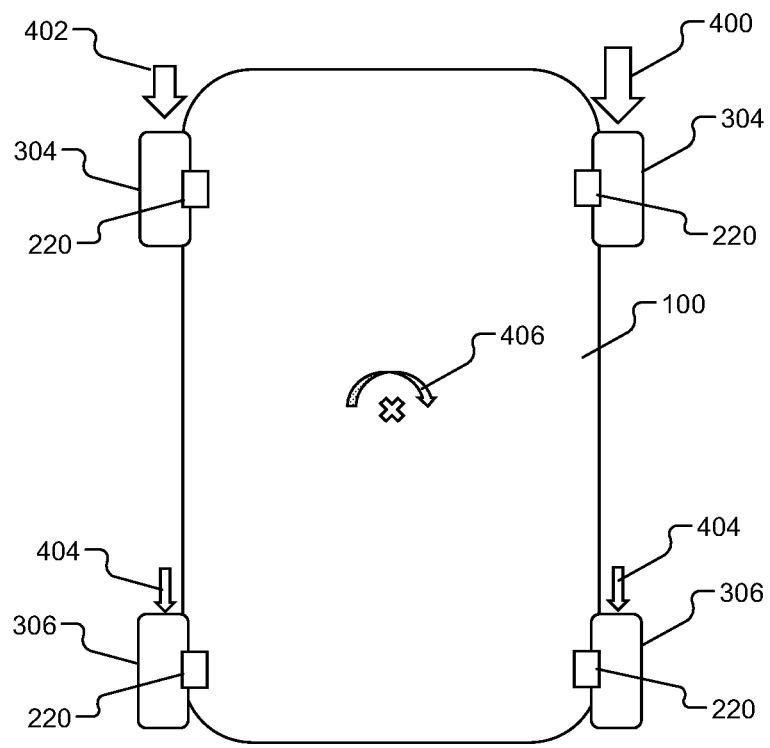
FIG. 4 is a top view of the vehicle of FIG. 1 illustrating relative and unbalanced application of brake torque via four active brake controllers while operating in a normal braking mode.

FIG. 4 shows the vehicle 100 illustrating relative and unbalanced application of brake torque via four active brake controllers while operating in a normal braking mode. In this example, all four brake controllers and/or assemblies 220 are active and applying brake pressure to each of the four wheels 304, 306 of the vehicle 100. In this example, the right front brake controller and/or assembly 220 provides greater brake traction force (or brake torque) than the left front brake, as represented by arrow 400 that is larger than the arrow 402. In this example, the left rear brake controller and/or assembly is providing a same amount of brake traction force as the right rear brake controller and/or assembly, which is represented by arrows 404. As a result, the vehicle 100 experiences an increased amount of yaw rate such that the vehicle pulls to the right, as shown by arrow 406.

The greater brake traction force on the right front wheel may be due to manufacturing differences in the brake calipers of the front wheels, small sizes differences in brake pads between the front calipers, a brake pad of the right front wheel hanging up, etc. The greater brake traction force may be due to an issue with the right front brake caliper and/or the right front brake controller and/or assembly. Clamp force and/or brake traction force may be adjusted at wheels other than where the greater amount of brake traction force exists. In one embodiment, adjustment in brake traction force at any of the brake controllers and/or assemblies is based on the reason for the imbalance and yaw rate and may be implemented to balance the right and left braking forces.

With intervention as disclosed herein, clamp force of one or more of the brake calipers 223 (shown in FIG. 2) of one or more of the brake controller and/or assemblies 220 is adjusted to compensate for the increase in yaw rate and to mitigate the yaw rate and the amount of vehicle pull. As an example, the brake controller and/or assembly of the right front wheel may reduce the amount of clamp force applied by the brake caliper of the right front wheel experiencing the increased brake traction force. This control is implemented by the braking stability module 204.

Figure 5:
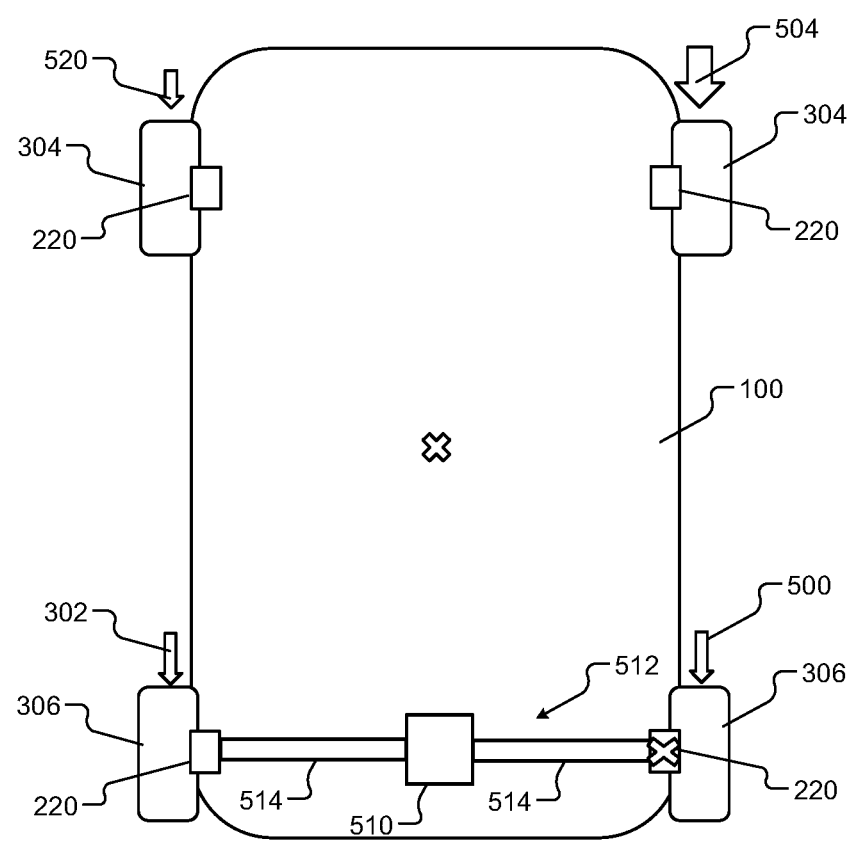
FIG. 5 is a top view of the vehicle of FIG. 1 illustrating yaw rate mitigated braking using three active brake controllers and/or assemblies due to a braking system failure associated with a fourth brake controller and/or assembly.

FIG. 5 shows the vehicle 100 illustrating yaw rate mitigated braking using three active brake controllers and/or assemblies due to a braking system failure associated with a fourth inactive brake controller and/or assembly. As an example, the failure may be with a brake controller and/or a brake caliper. In the example shown, the right rear brake controller and/or assembly is inactive due to an associated failure. Because of this failure, the brake controller and/or assembly may be deactivated, which is represented by the cross-out arrow 500.

In a legacy system, where for example two brake calipers are part of a same hydraulic circuit, failure at one of the brake calipers would result in both brake calipers not being used for braking. This would leave use of only the other two brake calipers for braking.

The examples disclosed herein include independent control of each brake controller and/or assembly including independent control of each brake caliper and control of states of differentials including engaged states of eLSDs and locked states of locking differentials. The stated control includes being able to deactivate any one or more brake calipers at any time. The independent control of the brake calipers, the amount of engagement of the eLSDs and the locked states of the locking differentials are based on the brake system issue, failure within the brake system, permanent vehicle handling characteristics and dynamic vehicle state parameters.

When as shown, one of the brake controllers and/or assemblies experiences a failure (e.g., failed brake caliper, improperly operating brake controller and/or other issue), that brake controller and/or assembly may be deactivated (e.g., hydraulic pressure to the brake caliper of that brake controller and/or assembly is reduced minimized and/or reduced to zero). Brake traction force of one or more brake calipers of one or more other brake controllers may be adjusted, an amount of eLSD engagement may be adjusted, and/or a locked state of a corresponding differential may be changed to balance brake force on each side of the vehicle, reduce yaw rate of the vehicle, and/or prevent yaw rate of the vehicle from increasing.

In the example shown, the right rear brake caliper is deactivated and the brake traction force (or clamping force) of the right front caliper may be increased, as represented by large arrow 504. In addition or as an alternative, i) the amount of engagement between left and right axles of a differential 510 may be adjusted if the differential 510 is an eLSD, or ii) the locked state of the differential 510 may be changed to a locked state if the differential 510 is a locking differential. As an example, the vehicle 100 may include a rear axle 512 including the differential 510, which may be connected to the rear wheels via shafts 514. Although not shown in FIG. 5, the vehicle 100 may also include a front axle including a differential engaging left and right axles to rotate the front wheels of the vehicle 100.

An eLSD refers to a differential that controls amount of torque provided to each wheel via respective axle shafts of a single axle (sometimes referred to as a rear end or front end). The amount of difference in speeds of the wheels may be limited and/or controlled. This control may occur at the differential and/or via, for example, the vehicle control module 104 of FIG. 1 or other control module. The amount of torque being provided to each wheel may be based on outputs of sensors, such as wheel speed sensors measuring speeds of the wheels of the axle, steering angle sensor, motor speeds sensor, engine speed sensor, etc. This may include adjusting an amount of torque transfer from a driveshaft to each of the axle shafts and/or the percentage of engagement between the axle shafts.

A locking differential refers to a differential that locks axle shafts of an axle together. The axle shafts may rotate independently (or freely) or may be locked together to rotate at the same speed. While the host vehicle is turning, the locking differential operates as an open differential to allow the wheels to rotate freely.

The brake traction force (or clamping force) of one or more of the left side calipers may be reduced, as represented by small arrow 520. In the example shown, the brake traction force of the left front caliper is reduced and/or modulated (i.e., adjusted), as shown. This may be done to prevent the yaw rate of the vehicle from exceeding a predetermined threshold.

Figure 6:
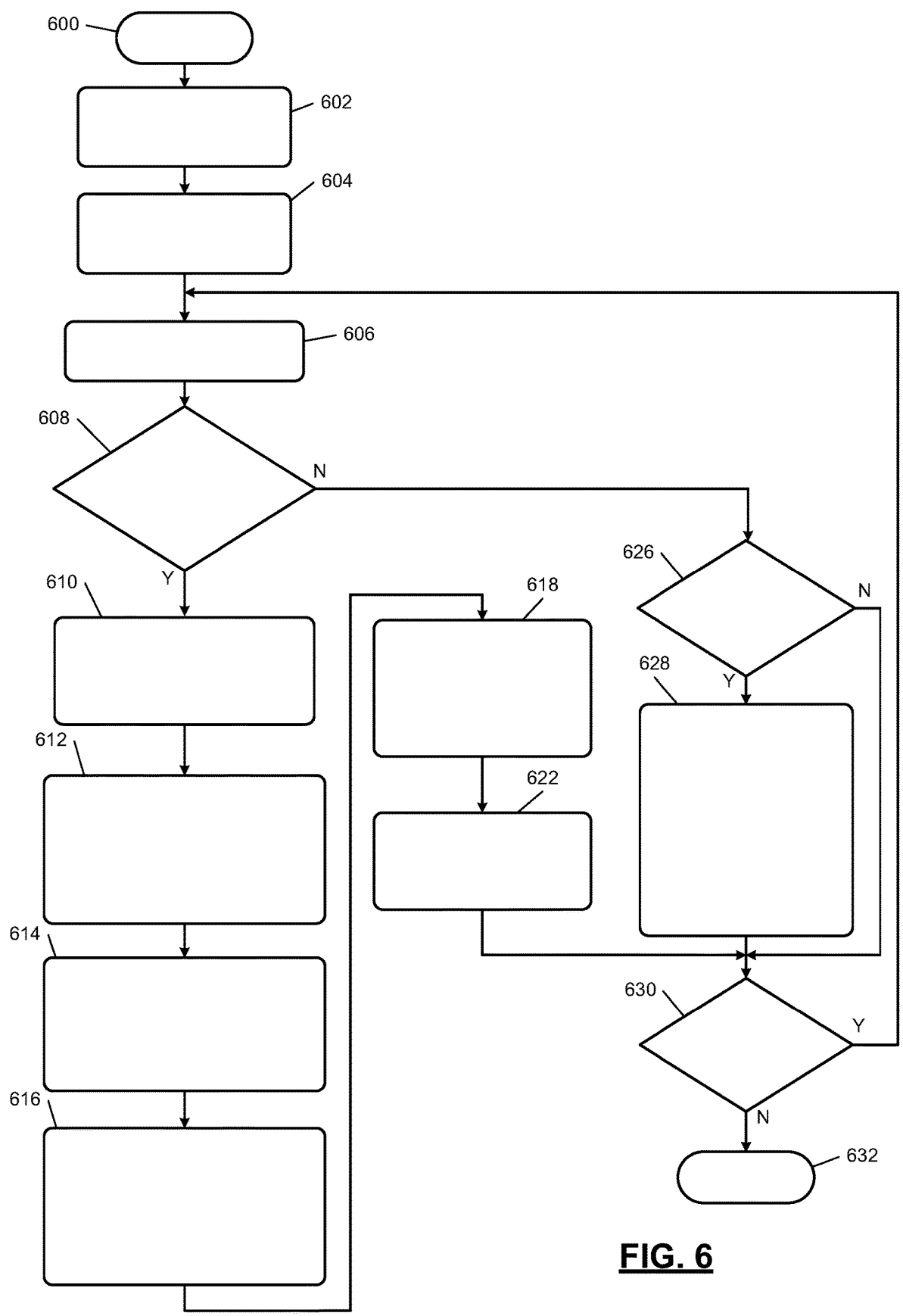
FIG. 6 illustrates a braking stability method for a vehicle having an electronic limited slip differential (eLSD) in accordance with the present disclosure.

FIG. 6 shows a braking stability method for a vehicle having an electronic limited slip differential. During this method eLSD devices are controlled by commanding amounts of differential coupling torque. The following operations may be performed by, for example, one of the braking stability modules and/or corresponding control modules disclosed herein. Although the following method is primarily described with respect to a vehicle having four brake circuits, the vehicle may have more than four brake circuits respectively for more than four wheels and similar operations may be performed.

The method may begin at 600. At 602, the braking stability module may receive a brake torque request signal from the brake actuator 170 and/or from, for example, the vehicle control module 104 or the braking module 212.

At 604, the braking stability module determines permanent vehicle handling characteristics such as the characteristics referred to herein. These characteristics may be stored in the memory 106 and accessed by the braking stability module.

At 606, the braking stability module determines dynamic vehicle state parameters such as the dynamic vehicle state parameters referred to herein. The parameters may be received from sensors and/or other devices referred to herein and/or may be determined based on the outputs of the sensors and/or other devices. The dynamic vehicle state parameters may be stored in the memory 106.

At 608, the braking stability module may determine if there has been a braking system failure at a first brake controller and/or assembly of an axle having an eLSD. This may occur, for example, when a brake controller, a brake caliper, and/or other component of a brake controller and/or assembly is not operating appropriately, experiences a short circuit, is not communicating, is ceased, etc. As an example, a brake caliper may be "frozen" and/or inoperable. As another example, a hydraulic fluid line supplying hydraulic fluid to a brake caliper and/or the brake caliper may have a hydraulic fluid leak. The first brake controller and/or assembly that has failed may be deactivated. If a failure exists, operation 610 is performed, otherwise operation 626 may be performed.

At 610, the braking stability module may, determine, based on for example the steering angle of the vehicle, a maximum eLSD coupling possible while avoiding wheel scrub. The eLSD coupling refers to the percentage of engagement between left and right axle shafts of an axle. The more eLSD coupling (or percentage of engagement), the more brake torque transfer across the axle. The maximum eLSD coupling may refer to a maximum percentage of engagement of the eLSD without causing wheel scrub at one of the wheels of the axle, which has a failed brake actuator. Wheel scrub refers to when a wheel is not rotating as it normally would such that the wheel is sliding, slipping, experiencing intermittent skidding, etc. This determination is made to determine an amount of braking force that can be applied using a second brake controller and/or assembly that is on the same axle and has not failed. The axle with the failed (or first) brake controller and/or assembly includes the eLSD and the non-failed (or second) controller and/or assembly.

In an embodiment, the maximum eLSD coupling is determined based on speeds of the wheels of the axle, accelerations and decelerations of the wheels, target wheel speeds, wheel speeds induced by steering, a model of tire dynamics and corresponding friction on road versus brake torque friction achieved with eLSD, braking friction achieved with the eLSD, and vehicle geometry including a distance between the wheels. Tire traction estimation may be determined based on lateral tire force, normal tire force, tire temperature estimation, vehicle velocity, road grade, and steering input (or road wheel angle). Wheel speed feedback may be provided based on i) steering input, vehicle speed, and an expected difference in wheel speeds on each end of the axle of the eLSD. The expected difference is determined and/or known and stored in memory based on vehicle geometry. If wheel speeds across the eLSD are within a predetermined range of each other during a turning event, this is indicative of one of the wheels slipping. If a wheel is slipping, the braking stability module may decrease the differential coupling torque commanded to the eLSD until normal wheel rotation (not slipping) is achieved. The stated model may be based on the tire traction estimation, wheel slip feedback, and road conditions, which may be determined based on weather and ambient temperature.

At 612, the braking stability module may determine, based on the amount of eLSD coupling, a percentage of brake torque that would be transferred across the axle having the failed brake controller and/or assembly.

At 614, the braking stability module may determine a maximum amount of brake torque that is able to be provided by the axle via the active brake controller and/or assembly of the axle. Operations 612 and 614 provide the brake torque capability at the wheels of the axle.

At 616, the braking stability module may, based on braking input (e.g., a brake torque request due to actuation of the brake actuator 170 of FIG. 1) detected at 602, the percentage of brake torque that would be transferred across the axle, and the maximum amount of brake torque that is able to be provided via the first axle, determine amount of front and rear brake toque and amounts of left and right distribution of brake torque on the axle. The amounts of brake torque provided by front and rear axles may be determined to adjust pitch of the vehicle. In an embodiment, the amounts of brake torque selected to minimize front to rear pitch of the vehicle and/or prevent the pitch from exceeding a predetermined angular threshold (e.g., 3-10°). In another embodiment, the additional brake torque is provided to the front axle to increase braking force and decrease stopping distance and time, which can increase pitch of the vehicle.

At 618, the braking stability module may determine amounts of brake torque distribution on one or more other axles of the vehicle. For example, if the failed brake controller and/or assembly is on the rear axle, then brake torque distribution to the brake controllers and/or assemblies on the front axle of the vehicle may be determined. This may be determined based on the amounts of brake torque provided to the left and right brake controllers and/or assemblies of the rear axle and to minimize yaw rate of the vehicle. The one or more other axles may i) be solid axles where each wheel of the axle spins at a same speed, ii) include an eLSD or locking differential, or iii) include independently controlled axle shafts for left and right wheels.

As an example, if the vehicle has two axles and is heading forward and is not turning, the braking stability module may fully engage the eLSD of the first axle and maximum coupling is 100%. This allows 50% of the brake torque to be transferred from the active brake controller and/or assembly via the corresponding axle to the wheel at the failed brake controller and/or assembly. To further provide equal distribution of brake torque between left and right sides of the vehicle, the brake torque provided to the other axle of the vehicle may be equally distributed (50/50) to the brake controllers and/or assemblies of the other axle.

The brake torque supplied to the front axle may be different than the brake torque provided to the rear axle. The percentages of distribution of the front axle may be different than the percentages of distribution of the rear axle. For example, first one of the axles may equally distribute (50/50) the amount of brake torque being provided via left and right brake controllers and/or assemblies of the first one of the axles. A second one of the axles may unequally distribute the amount of brake torque being provided via left and right brake controllers and/or assemblies of the second one of the axles.

At 622, the braking stability module controls the eLSD and brake torque distribution based on the values determined at 610, 612, 614, 616, and 618. Operation 630 may be performed after operation 622.

At 626, the braking stability module may determine whether the yaw rate is outside of the first set predetermined range (e.g., −1.0 degree per second (deg/s) to 1.0 deg/s) and/or the amount of brake torque of one or more brake controllers and/or assemblies is outside a second set predetermined range. As an example, different and/or unexpected amounts of brake torque may be applied at the one or more brake controllers and/or assemblies. The different and/or unexpected amounts of brake torque may refer to when, for example, one brake controller and/or assembly on a first or driver side of the vehicle is providing an amount of brake torque that is outside of a second set predetermined range from an amount of brake torque applied at another brake controller and/or assembly on a second or passenger side of the vehicle. The set predetermined range may be, for example, ±1-5% of the amount of brake torque applied at the driver side brake controller and/or assembly. As another example, the unexpected amount may be a ±1-5% difference from a target amount of brake torque. The target amount for a brake controller and/or assembly on a first side (driver or passenger side) of the vehicle, depending on the situation, may be i) within ±1-5% of a target amount for another brake controller and/or assembly on a second side (the other one of the driver or passenger side) of the vehicle, or ii) more or less than ±1-5% different than a target amount for another brake controller and/or assembly on a second side (the other one of the driver or passenger side) of the vehicle. The situations may refer to, for example, whether the vehicle is heading along a linear path, is merging, is experiencing loss in traction at one or more wheels, and/or is turning, which may include applying the same or different amounts of brake torque on different sides of the vehicle and/or at different wheels on a same side of the vehicle. If outside the first set predetermined range and/or the second set predetermined range, operation 628 may be performed otherwise, operation 630 may be performed.

At 628, the braking stability module may i) adjust modulation of one or more of the active brake controllers and/or assemblies, and/or ii) adjust amount of engagement of the eLSD, to reduce yaw rate of the vehicle and/or reduce side-to-side brake torque differential. This may include, for example, adjusting the amount of engagement of the eLSD and/or the distribution of brake torque between left and right sides of the vehicle, as described above.

Operations 618 and 628 are implemented to prevent vehicle pulling. If non-symmetrical brake torque is applied to brakes of the vehicle 100, the vehicle 100 pulls to one side. Operations 622 and 628 are performed based on the permanent vehicle handling characteristics, the dynamic vehicle state parameters, and locations of the active brake circuits to maintain vehicle stability. This includes modulating the braking force at the active brake controllers and/or assemblies to maintain the yaw rate of the vehicle within the predetermined range and the appropriate amount of vehicle deceleration. Less force may be provided to a front brake caliper than a rear brake caliper, when a lower amount of yaw correction is being provided, because the front brake caliper provides more yaw correction.

During operations 622 and 628 when the side-to-side brake torque differential exceeds a predetermined threshold, one or more gain scaling factors may be applied respectively to the clamping forces applied at one or more of the brake controllers and/or assemblies to change the amount of clamping force applied and reduce the side-to-side brake torque differential. For example, when the amount of brake torque applied on a first side of the vehicle 100 is more than 1-5% higher than the amount of brake torque applied on a second side of the vehicle 100, than one or more gain scaling factors may be applied to reduce the amount of clamping force on the first side of the vehicle 100 or to increase the amount of clamping force on the second side of the vehicle 100. The brake torque applied on each side of the vehicle is able to be adjusted in real time (e.g., within milliseconds when dynamic vehicle state parameters are detected) and/or instantaneously to i) equalize side-to-side the amounts of brake torque applied, ii) reduce and/or minimize yaw rate of the vehicle 100, and/or iii) prevent the yaw rate of the vehicle 100 from increasing.

At 630, the braking stability module may determine whether brake torque is still being requested. If yes, operation 606 may be performed, otherwise the method may end at 632.

Figure 7:
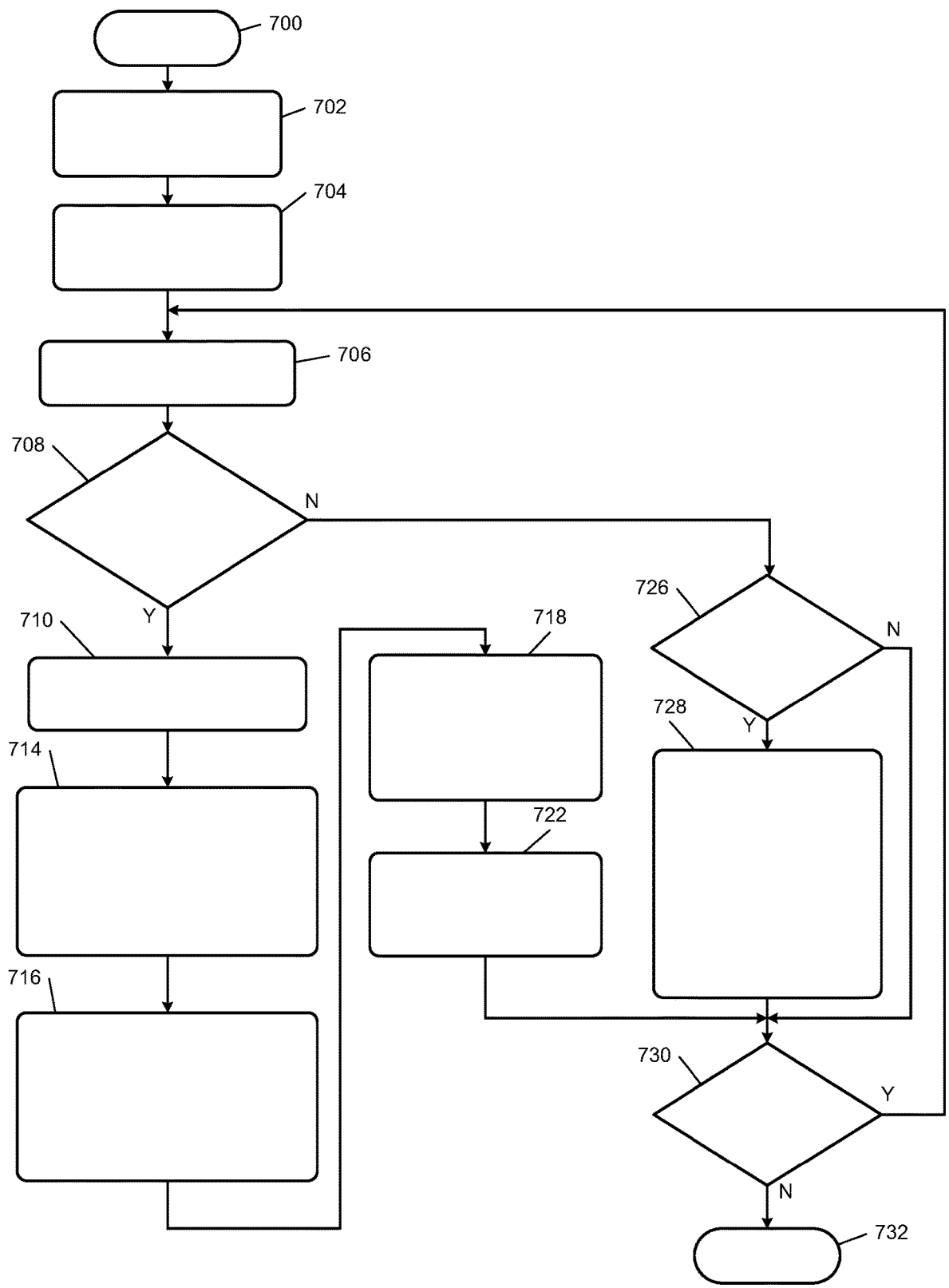
FIG. 7 illustrates a braking stability method for a vehicle having a locking differential in accordance with the present disclosure In the drawings, reference numbers may be reused to identify similar and/or identical elements.

FIG. 7 shows a braking stability method for a vehicle having a locking differential. The following operations may be performed by, for example, one of the braking stability modules and/or corresponding control modules disclosed herein. Although the following method is described with respect to a vehicle having four brake circuits, the vehicle may have more than four brake circuits respectively for more than four wheels and similar operations may be performed.

The method may begin at 700. At 702, the braking stability module may receive a brake torque request signal from the brake actuator 170 and/or from, for example, the vehicle control module 104 or the braking module 212.

At 704, the braking stability module determines permanent vehicle handling characteristics such as the characteristics referred to herein. These characteristics may be stored in the memory 106 and accessed by the braking stability module.

At 706, the braking stability module determines dynamic vehicle state parameters such as the dynamic vehicle state parameters referred to herein. The parameters may be received from sensors and/or other devices referred to herein and/or may be determined based on the outputs of the sensors and/or other devices. The dynamic vehicle state parameters may be stored in the memory 106.

At 708, the braking stability module may determine if there has been a braking system failure at a first brake controller and/or assembly of an axle having a locking differential. If a failure exists, operation 710 is performed, otherwise operation 726 may be performed.

At 710, the braking stability module locks the locking differential such that the wheels of the corresponding axle spin at the same speed.

At 714, the braking stability module may, determine a maximum amount of brake torque that is able to be provided by the axle via the active brake controller and/or assembly of the axle. This may be determined based on speeds of the wheels of the axle, accelerations and decelerations of the wheels, target wheel speeds, wheel speeds induced by steering, a model of tire dynamics and corresponding friction on road versus brake torque friction achieved with locking differential, braking friction achieved with the locking differential, and vehicle geometry including a distance between the wheels. The stated model may be based on based on road conditions, which may be determined based on weather and ambient temperature. Operation 714 provides the brake torque capability at the wheels of the axle.

At 716, the braking stability module may, based on braking input (e.g., a brake torque request due to actuation of the brake actuator 170 of FIG. 1) received at 702 and the maximum amount of brake torque that is able to be provided via the axle, determine amounts of front and rear axle brake torque and amounts of left and right distribution of brake torque on the axle having the locking differential and failed brake controller and/or assembly. The amounts of brake torque provided by front and rear axles may be determined to adjust pitch of the vehicle.

At 718, the braking stability module may determine amounts of brake torque distribution on one or more other axles of the vehicle. For example, if the failed brake controller and/or assembly is on the rear axle, then brake torque distribution to the brake controllers and/or assemblies on the front axle of the vehicle may be determined. This may be determined based on the amounts of brake torque provided to the left and right brake controllers and/or assemblies of the rear axle and to minimize yaw rate of the vehicle. The one or more other axles may i) be solid axles where each wheel of the axle spins at a same speed, ii) include an eLSD or locking differential, or iii) include independently controlled axle shafts for left and right wheels. The left and right brake controllers and/or assemblies may apply difference amounts of force to achieve a net stopping torque difference. In an embodiment, anti-lock braking and electronic stability control braking may also be active to prevent locking of brake calipers being actuated and to prevent wheel slipping.

At 722, the braking stability module controls brake torque distribution based on the values determined at 714, 716, and 718. Operation 730 may be performed after operation 722.

At 726, the braking stability module may determine whether the yaw rate is outside of the first set predetermined range (e.g., −1.0 degree per second (deg/s) to 1.0 deg/s) and/or the amount of brake torque of one or more brake controllers and/or assemblies is outside a second set predetermined range. As an example, different and/or unexpected amounts of brake torque may be applied at the one or more brake controllers and/or assemblies. The different and/or unexpected amounts of brake torque may refer to when, for example, one brake controller and/or assembly on a first or driver side of the vehicle is providing an amount of brake torque that is outside of a second set predetermined range from an amount of brake torque applied at another brake controller and/or assembly on a second or passenger side of the vehicle. The set predetermined range may be, for example, ±1-5% of the amount of brake torque applied at the driver side brake controller and/or assembly. As another example, the unexpected amount may be a ±1-5% difference from a target amount of brake torque. The target amount for a brake controller and/or assembly on a first side (driver or passenger side) of the vehicle, depending on the situation, may be i) within ±1-5% of a target amount for another brake controller and/or assembly on a second side (the other one of the driver or passenger side) of the vehicle, or ii) more or less than ±1-5% different than a target amount for another brake controller and/or assembly on a second side (the other one of the driver or passenger side) of the vehicle. The situations may refer to, for example, whether the vehicle is heading along a linear path, is merging, is experiencing loss in traction at one or more wheels, and/or is turning, which may include applying the same or different amounts of brake torque on different sides of the vehicle and/or at different wheels on a same side of the vehicle. If outside the first set predetermined range and/or the second set predetermined range, operation 728 may be performed otherwise, operation 730 may be performed.

At 728, the braking stability module may adjust modulation of one or more of the active brake controllers and/or assemblies to reduce yaw rate of the vehicle and/or reduce side-to-side brake torque differential. This may include, for example, adjusting the distribution of brake torque between left and right sides of the vehicle, as described above.

Operations 718 and 728 are implemented to prevent vehicle pulling. If non-symmetrical brake torque is applied to brakes of the vehicle 100, the vehicle 100 pulls to one side. Operations 722 and 728 are performed based on the permanent vehicle handling characteristics, the dynamic vehicle state parameters, and locations of the active brake circuits to maintain vehicle stability. This includes modulating the braking force at the active brake controllers and/or assemblies to maintain the yaw rate of the vehicle within the predetermined range and the appropriate amount of vehicle deceleration. Less force may be provided to a front brake caliper than a rear brake caliper, when a lower amount of yaw correction is being provided, because the front brake caliper provides more yaw correction.

During operations 722 and 728 when the side-to-side brake torque differential exceeds a predetermined threshold, one or more gain scaling factors may be applied respectively to the clamping forces applied at one or more of the brake controllers and/or assemblies to change the amount of clamping force applied and reduce the side-to-side brake torque differential. For example, when the amount of brake torque applied on a first side of the vehicle 100 is more than 1-5% higher than the amount of brake torque applied on a second side of the vehicle 100, than one or more gain scaling factors may be applied to reduce the amount of clamping force on the first side of the vehicle 100 or to increase the amount of clamping force on the second side of the vehicle 100. The brake torque applied on each side of the vehicle is able to be adjusted in real time (e.g., within milliseconds when dynamic vehicle state parameters are detected) and/or instantaneously to i) equalize side-to-side the amounts of brake torque applied, ii) reduce and/or minimize yaw rate of the vehicle 100, and/or iii) prevent the yaw rate of the vehicle 100 from increasing.

At 730, the braking stability module may determine whether brake torque is still being requested. If yes, operation 706 may be performed, otherwise the method may end at 732.

The above-described operations of FIGS. 6-7 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

In the above-described examples, electronic brake distribution (EBD) between brake controllers and/or assemblies of different axles and between left and rights sides of the vehicle including dynamic rear proportioning (DRP) may be implemented. In an embodiment, EBD is implemented during base brake events, when there is no locking of actuated brake calipers and/or wheel slippage, such that ABS is not active and/or electronic stability control is not actively preventing wheel slippage.

A hard braking event can cause a vehicle to pitch forward resulting in increased mass loading on a front axle and therefore higher normal force on front tires of the vehicle. Since tire traction increases with tire normal force, EBD proportions more brake torque to the front brake controllers and/or assemblies to take advantage of available tire traction. This may occur independent of whether one of the brake controllers and/or assemblies has failed. A vehicle has minimal pitch during light braking events. During light brake events, EBD may not be used and a same or similar amount of brake torque may be applied at all wheels of the vehicle when none of the brake controllers and/or assemblies has failed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A braking system comprising:
   a plurality of brake circuits for four wheels of a vehicle and configured to be independently controlled, activated and deactivated and when activated apply independently selected amounts of braking force respectively at the wheels, wherein each of the four wheels has a respective designated one of the plurality of brake circuits; and a braking stability module configured to i) detect a failure with a first one of the plurality of brake circuits of a first axle of the vehicle, ii) in response to detecting the failure, determine whether to lock or adjust an amount of engagement of a differential of the first axle of the vehicle, iii) selectively lock or adjust the amount of engagement of the differential to distribute brake force from a second one of the plurality of brake circuits of the first axle to one of the wheels at the first one of the plurality of brake circuits, and iv) control operation of the second one of the plurality of brake circuits to brake torque the one of the wheels at the first one of the plurality of brake circuits, wherein the braking stability module is configured, in response to detecting the failure with the first one of the plurality of brake circuits, to i) determine whether to lock or adjust an amount of engagement of another differential of one or more other axles of the vehicle, and ii) selectively lock or adjust the amount of engagement of the another differential to distribute brake force from a third one of the plurality of brake circuits of the one or more other axles to one of the wheels at a fourth one of the plurality of brake circuits.

2. The braking system of claim 1, wherein the braking stability module is configured to control operation of the second one of the plurality of brake circuits to concurrently brake torque the one of the wheels at the first one of the plurality of brake circuits and the one of the wheels at the second one of the plurality of brake circuits.

3. The braking system of claim 1, wherein:
the differential is a locking differential; and
the braking stability module is configured to, in response to detecting the failure with a first one of the plurality of brake circuits, lock the differential.

4. The braking system of claim 1, wherein the braking stability module is configured to, in response to detecting the failure with a first one of the plurality of brake circuits, adjust the amount of engagement of the differential to adjust an amount of brake torque transfer from the second one of the plurality of brake circuits to the one of the wheels at the first one of the plurality of brake circuits.

5. The braking system of claim 1, wherein the braking stability module is configured to adjust the amount of engagement of the differential to minimize a yaw rate of the vehicle during a braking event.

6. The braking system of claim 1, wherein the braking stability module is configured to:
based on a steering angle of the vehicle, determine a maximum amount of electronic limited slip differential coupling possible while avoiding wheel scrub;
based on the maximum amount of electronic limited slip differential coupling, determine a percentage of brake torque that would be transferred across the first axle;
determine a maximum amount of brake torque that is able to be provided by the first axle via the second one of the plurality of brake circuits;
based on a braking input request, the percentage of brake torque that would be transferred across the first axle, and the maximum amount of brake torque that is able to be provided via the first axle, determine amounts of brake torque for the first axle and a second axle and amounts to distribute to the first one of the plurality of brake circuits and the second one of the plurality of brake circuits;
adjust the amount of engagement of the differential based on the amounts of brake torque for the first axle and the second axle and the amounts to distribute to the first one of the plurality of brake circuits and the second one of the plurality of brake circuits;
determine amounts of brake torque to distribute to a third one of the plurality of brake circuits of the second axle and a fourth one of the plurality of brake circuits of the second axle to minimize yaw rate of the vehicle; and
adjust the amount of engagement of the differential and control brake torque distribution based on the determined amounts of brake torque to distribute to the first one of the plurality of brake circuits, the second one of the plurality of brake circuits, the third one of the plurality of brake circuits, and the fourth one of the plurality of brake circuits.

7. The braking system of claim 1, wherein:
the differential is a locking differential; and
the braking stability module is configured to
in response to detecting the failure, lock the differential,
while the differential is locked, determine a maximum amount of brake torque that is able to be provided by the first axle via the second one of the plurality of brake circuits,
based on a braking input request and the maximum amount of brake torque that is able to be provided via the first axle and to minimize yaw rate of the vehicle, determine amounts of brake torque for the first axle and a second axle and amounts to distribute to the first one of the plurality of brake circuits and the second one of the plurality of brake circuits, and
control some of the plurality of brake circuits, not including the first one of the plurality of brake circuits, based on the amounts of brake torque for the first axle and the second axle and the amounts to distribute to the first one of the plurality of brake circuits and the second one of the plurality of brake circuits.

8. The braking system of claim 1, wherein the braking stability module is configured to determine a side-to-side brake torque differential of the vehicle and reduce the side-to-side brake torque differential by adjusting brake torque provided by the plurality of brake circuits except the first one of the plurality of brake circuits, which is deactivated.

9. The braking system of claim 1, wherein the braking stability module is configured to detect a failure of the first one of the plurality of brake circuits and maintain active operation of all of the other ones of the plurality of brake circuits to maximize deceleration of the vehicle while minimizing yaw rate of the vehicle.

10. The braking system of claim 1, wherein the differential is an electronic limited slip differential or a locking differential.

11. A braking stability method comprising:
detecting a failure with a first one of a plurality of brake circuits of a first axle of a vehicle, the plurality of brake circuits being for four wheels of the vehicle and configured to be independently controlled, activated and deactivated and when activated apply independently selected amounts of braking force respectively at the wheels, wherein each of the four wheels has a respective designated one of the plurality of brake circuits;
in response to detecting the failure, determining whether to lock or adjust an amount of engagement of a differential of the first axle of the vehicle;
selectively locking or adjusting an amount of engagement of the differential of the first axle of the vehicle to distribute brake force from a second one of the plurality of brake circuits of the first axle to the one of the wheels at the first one of the plurality of brake circuits;

controlling operation of the second one of the plurality of brake circuits to brake torque the one of the wheels at the first one of the plurality of brake circuits; and in response to detecting the failure with the first one of the plurality of brake circuits, i) determining whether to lock or adjust an amount of engagement of another differential of one or more other axles of the vehicle, and ii) selectively locking or adjusting the amount of engagement of the another differential to distribute brake force from a third one of the plurality of brake circuits of the one or more other axles to one of the wheels at a fourth one of the plurality of brake circuits.

12. The braking stability method of claim 11, further comprising controlling operation of the second one of the plurality of brake circuits to concurrently brake torque the one of the wheels at the first one of the plurality of brake circuits and the one of the wheels at the second one of the plurality of brake circuits.

13. The braking stability method of claim 11, further comprising, in response to detecting the failure with a first one of the plurality of brake circuits, lock the differential.

14. The braking stability method of claim 11, further comprising, in response to detecting the failure with a first one of the plurality of brake circuits, adjusting the amount of engagement of the differential to adjust an amount of brake torque transfer from the second one of the plurality of brake circuits to the one of the wheels at the first one of the plurality of brake circuits.

15. The braking stability method of claim 11, further comprising adjusting the amount of engagement of the differential to minimize a yaw rate of the vehicle during a braking event.

16. The braking stability method of claim 11, further comprising:
based on a steering angle of the vehicle, determining a maximum amount of electronic limited slip differential coupling possible while avoiding wheel scrub;
based on the maximum amount of electronic limited slip differential coupling, determining a percentage of brake torque that would be transferred across the first axle;
determining a maximum amount of brake torque that is able to be provided by the first axle via the second one of the plurality of brake circuits;
based on a braking input request, the percentage of brake torque that would be transferred across the first axle, and the maximum amount of brake torque that is able to be provided via the first axle, determining amounts of brake torque for the first axle and a second axle and amounts to distribute to the first one of the plurality of brake circuits and the second one of the plurality of brake circuits;
adjusting the amount of engagement of the differential based on the amounts of brake torque for the first axle and the second axle and the amounts to distribute to the first one of the plurality of brake circuits and the second one of the plurality of brake circuits;
determining amounts of brake torque to distribute to a third one of the plurality of brake circuits of the second axle and a fourth one of the plurality of brake circuits of the second axle to minimize yaw rate of the vehicle; and
adjusting the amount of engagement of the differential and control brake torque distribution based on the determined amounts of brake torque to distribute to the first one of the plurality of brake circuits, the second one of the plurality of brake circuits, the third one of the plurality of brake circuits, and the fourth one of the plurality of brake circuits.

17. The braking stability method of claim 11, further comprising:
in response to detecting the failure, locking the differential;
while the differential is locked, determining a maximum amount of brake torque that is able to be provided by the first axle via the second one of the plurality of brake circuits;
based on a braking input request and the maximum amount of brake torque that is able to be provided via the first axle and to minimize yaw rate of the vehicle, determining amounts of brake torque for the first axle and a second axle and amounts to distribute to the first one of the plurality of brake circuits and the second one of the plurality of brake circuits; and
controlling some of the plurality of brake circuits, not including the first one of the plurality of brake circuits, based on the amounts of brake torque for the first axle and the second axle and the amounts to distribute to the first one of the plurality of brake circuits and the second one of the plurality of brake circuits.

18. The braking stability method of claim 11, further comprising determining a side-to-side brake torque differential of the vehicle and reducing the side-to-side brake torque differential by adjusting brake torque provided by the plurality of brake circuits except the first one of the plurality of brake circuits, which is deactivated.

19. The braking stability method of claim 11, further comprising detecting a failure of the first one of the plurality of brake circuits and maintaining active operation of all of the other ones of the plurality of brake circuits to maximize deceleration of the vehicle while minimizing yaw rate of the vehicle.

* * * * *